United States Patent
LaPera et al.

(10) Patent No.: US 11,143,194 B2
(45) Date of Patent: Oct. 12, 2021

(54) SEAL DISASSEMBLY AID

(71) Applicant: United Technologies Corporation, Farmington, CT (US)

(72) Inventors: Joshua G. LaPera, West Hartford, CT (US); Robert L. Hazzard, Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 336 days.

(21) Appl. No.: 16/188,599

(22) Filed: Nov. 13, 2018

(65) Prior Publication Data
US 2020/0149543 A1  May 14, 2020

(51) Int. Cl.
*F04D 29/12* (2006.01)
*F01D 11/00* (2006.01)
*F04D 29/08* (2006.01)
*F16J 15/06* (2006.01)

(52) U.S. Cl.
CPC .......... *F04D 29/122* (2013.01); *F01D 11/003* (2013.01); *F04D 29/083* (2013.01); *F16J 15/061* (2013.01)

(58) Field of Classification Search
CPC .... F04D 29/122; F04D 29/083; F01D 11/001; F01D 11/003; F16J 15/061
See application file for complete search history.

(56) References Cited

U.S. PATENT DOCUMENTS

| 2016/0130963 A1* | 5/2016 | Wilson | F01D 11/025 60/805 |
| 2017/0248236 A1* | 8/2017 | Simpson | F16J 15/447 |
| 2018/0045066 A1 | 2/2018 | Chuong | |

FOREIGN PATENT DOCUMENTS

EP  3428489 A1  1/2019

OTHER PUBLICATIONS

European Search Report for European Application No. 19208985.2 dated Apr. 6, 2020.

* cited by examiner

*Primary Examiner* — David E Sosnowski
*Assistant Examiner* — Sabbir Hasan
(74) *Attorney, Agent, or Firm* — Carlson, Gaskey & Olds, P.C.

(57) ABSTRACT

A seal assembly for a gas turbine engine includes a seal carrier and a seal press fit within an inner diameter of the seal carrier. The seal includes an outer ring supporting a radially moveable shoe supported by at least one beam. The outer ring includes an inner radial surface having at least one tab extending radially inward toward the shoe for aiding removal of the seal from the carrier.

10 Claims, 7 Drawing Sheets

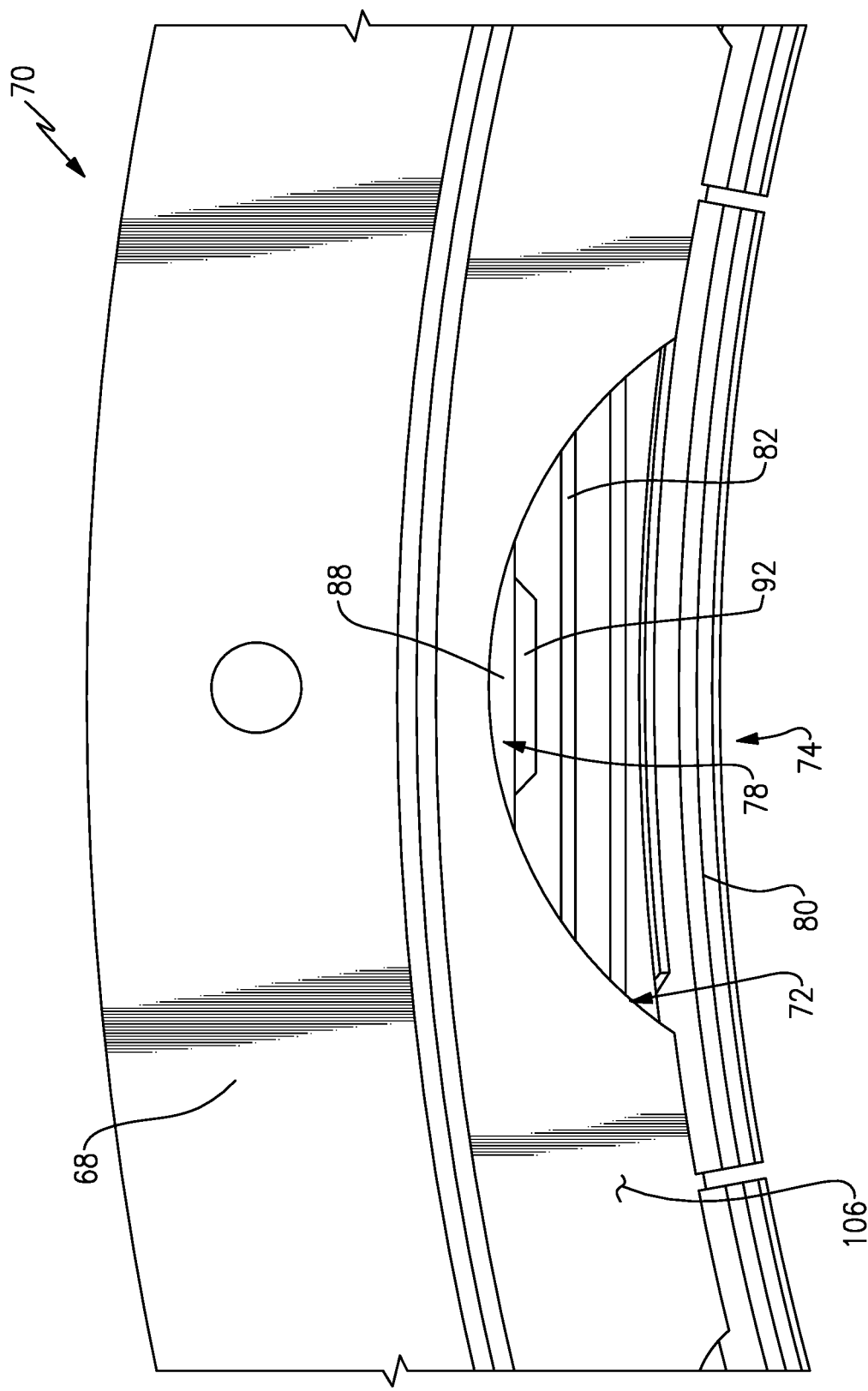

SEAL DISASSEMBLY AID

STATEMENT REGARDING FEDERALLY SPONSORED RESEARCH OR DEVELOPMENT

This subject of this disclosure was made with government support under Contract No.: W911W6-16-2-0012 awarded by the United Stated Army. The government therefore has certain rights in the disclosed subject matter.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy gas flow. The high-energy gas flow expands through the turbine section to drive the compressor and the fan section.

Leakage of the high-energy gas flow can reduce engine efficiency. Accordingly, seals are provided throughout the engine between relative moving components. One type of seal is known as a hydrostatic advanced low leakage seal (HALO) is supported within a seal carrier by seal retainers and an interference fit. Each seal is tailored to the specific size, location and operational conditions within the engine. The seal may therefore be relatively small for some engine locations and applications. An interference fit keeps components of the seal assembly and can prevent leakage past the seal. The interference fit can complicate disassembly during maintenance processes.

Turbine engine manufacturers continue to seek further improvements to engine performance including improvements to thermal, transfer, propulsive and maintenance efficiencies.

SUMMARY

A seal assembly for a gas turbine engine according to an exemplary embodiment of this disclosure includes, among other possible things, a seal carrier, and a seal press fit within an inner diameter of the seal carrier. The seal includes an outer ring supporting a radially moveable shoe supported by at least one beam. The outer ring includes an inner radial surface having at least one tab extending radially inward toward the shoe for aiding removal of the seal from the carrier.

In a further embodiment of a seal assembly for a gas turbine engine, the outer ring includes a first face and the seal carrier includes a stop wall portion extending radially inward. The stop wall portion includes a plurality of circumferentially spaced carrier openings, and at least one tab is a visible through at least one of the carrier openings.

In a further embodiment of any of the foregoing seal assemblies for a gas turbine engine, first and second seal retainers are included, and are received within the seal carrier that abut a second face of the seal carrier.

In a further embodiment of any of the foregoing seal assemblies for a gas turbine engine, the tab is spaced axially apart from the first face of the outer ring.

In a further embodiment of any of the foregoing seal assemblies for a gas turbine engine, the tab is flush with the first face of the outer ring.

In a further embodiment of any of the foregoing seal assemblies for a gas turbine engine, the at least one tab comprises a plurality of tabs aligned circumferentially with the carrier openings.

In a further embodiment of any of the foregoing seal assemblies for a gas turbine engine, the at least one tab extends axially toward the second face of the outer ring.

In a further embodiment of any of the foregoing seal assemblies for a gas turbine engine, the at least one tab is spaced axially apart from the second face of the outer ring.

In a further embodiment of any of the foregoing seal assemblies for a gas turbine engine, the at least one tab extends radially inward a distance less than a minimum distance between a radially outermost one of the beams and the outer ring.

A gas turbine engine according to an exemplary embodiment of this disclosure includes, among other possible things, a core engine including a compressor section, a combustor and a turbine section. A seal assembly is disposed in at least one of the compressor section or the turbine section. The seal assembly includes a seal carrier and a seal press fit within an inner diameter of the seal carrier. The seal includes an outer ring supporting a moveable shoe supported by at least one beam, the outer ring including an inner radial surface having at least one tab extending radially inward toward the shoe for aiding removal of the seal from the carrier.

In a further embodiment of the foregoing gas turbine engine, the outer ring includes a first face spaced axially from a second face. The seal carrier includes a stop wall extending radially inward with a plurality of circumferentially spaced slots. The at least one tab is visible through at least one of the slots, and at least one seal retainer is supported within the seal carrier that abuts the second face seal.

In another embodiment of any of the foregoing gas turbine engines, the tab is spaced axially apart from the first face of the outer ring.

In another embodiment of any of the foregoing gas turbine engines, the at least one tab extends radially inward a distance less than a minimum distance between a radially outermost one of the beams and the outer ring.

A method of disassembling a seal ring assembly according to an exemplary embodiment of this disclosure includes, among other possible things, supporting a seal that includes an outer ring supporting a radially movable shoe within a carrier with an interference fit between an inner radial surface of the carrier and an outer radial surface of the outer ring of the seal. This provides at least one tab on a radially inner surface of the outer ring of the seal. Applying a removal force against the at least one tab of a seal in a first axial direction of a magnitude to overcome the interference fit between the radial surfaces is also included.

In a further embodiment of the foregoing method of disassembling a seal ring assembly the at least one tab comprises a plurality of tabs disposed about a circumference of the inner radial surface of the outer ring of the seal and the force is applied by a removal tool against the plurality of tabs.

In a further embodiment of any of the foregoing methods of disassembling a seal ring assembly, the carrier includes a plurality of slots corresponding to a circumferential location of the plurality of tabs and the removal tool extends through the slots to engage the plurality of tabs.

In a further embodiment of any of the foregoing methods of disassembling a seal ring assembly, a reaction force is applied in a direction opposite the removal force.

In a further embodiment of any of the foregoing methods of disassembling a seal ring assembly, at least one retainer is removed by application of the removal force against the seal.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 5 is an aft looking forward view of the example seal assembly.

DETAILED DESCRIPTION

Figure 1:
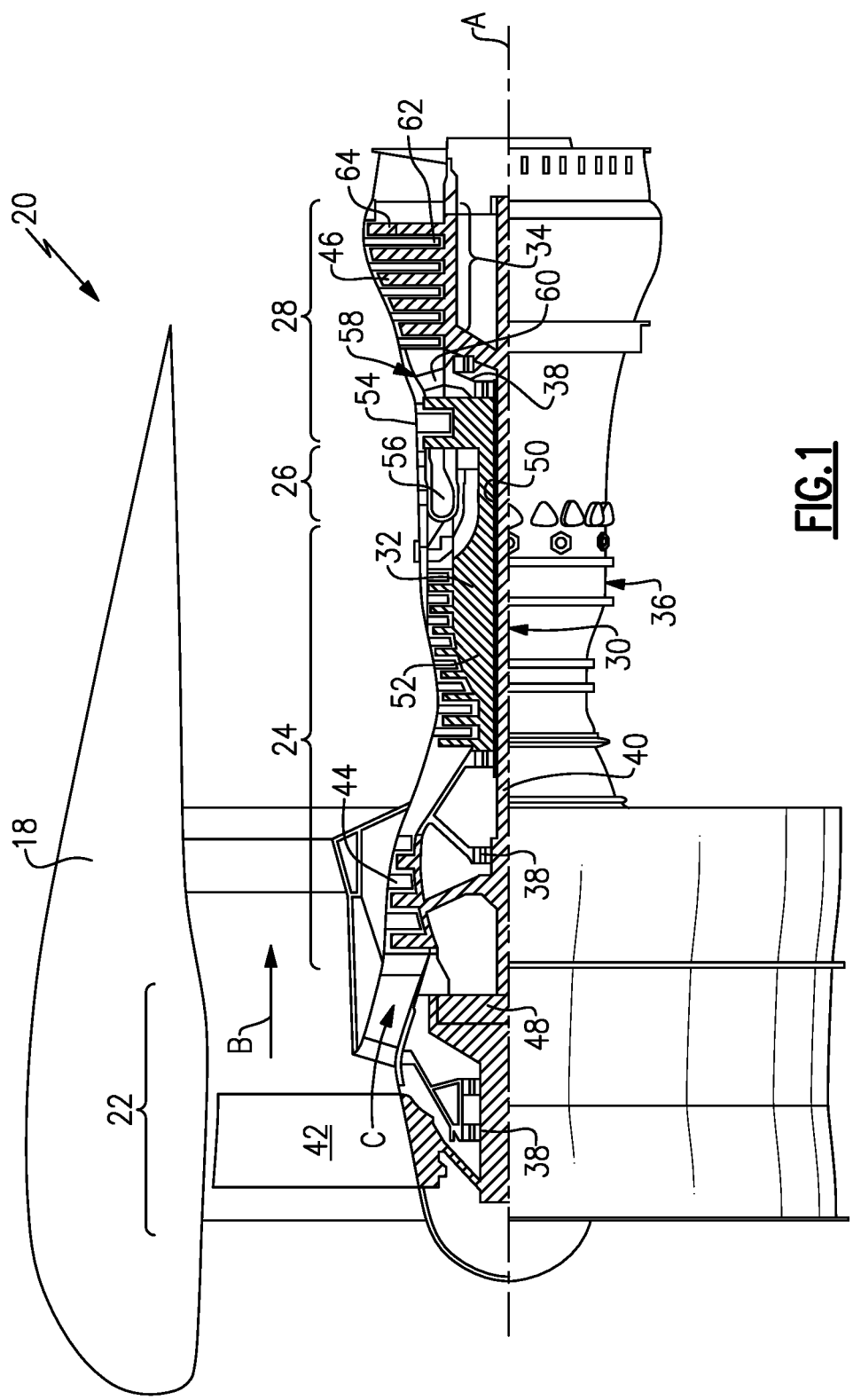
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
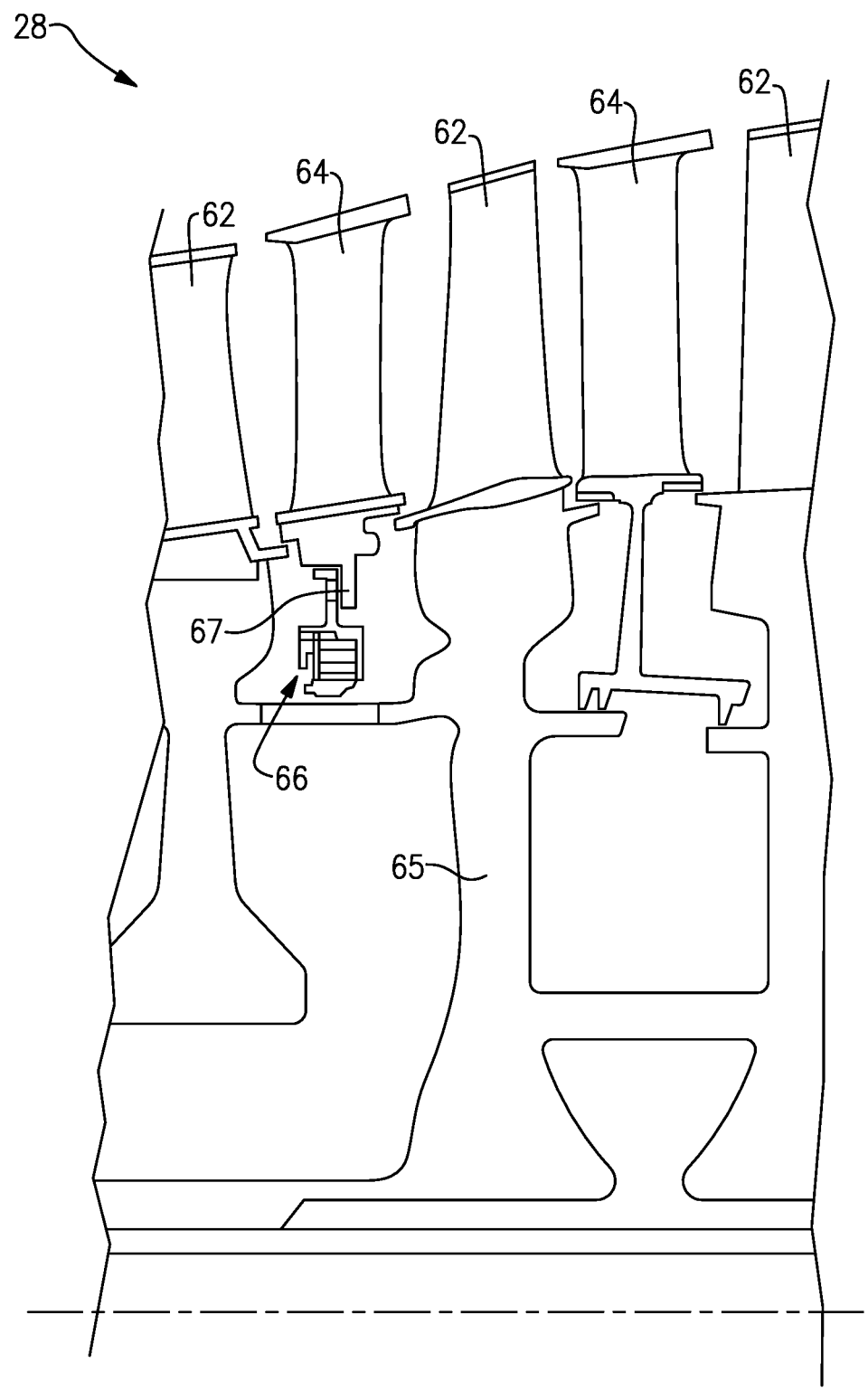
FIG. 2 is a schematic view of a seal assembly within a turbine section.

Referring to FIG. 2 with continued reference to FIG. 1, the turbine section 28 includes a plurality of turbine blades 62 that rotate about the axis A. Vanes 64 are disposed between the rotating blades 62 and are fixed. A seal assembly 66 is provided between one of the fixed vanes 64 and a rotor 65 supporting rotation of the turbine blades 62. The example seal assembly 66 is disposed between rotor stages and supported on an inner vane ring 67. The seal assembly 66 prevents leakage of high-energy exhaust gases between rotor stages past the fixed vane 64.

Referring to FIGS. 3, 4, 5 and 6A, the disclosed seal assembly 66 includes a seal 70 supported within a carrier 68. The seal 70 is a hydrostatic advanced low leakage seal commonly referred to as a HALO seal. The HALO seal 70 includes a radially movable shoe 80 that is supported within an outer ring 78 by beams 82. In this example, there are two beams 82 that enable radial movement of the shoe 80. The shoe 80 moves radially based on pressure differences to maintain a desired clearance between fixed and rotating components. Although a specific configuration of the HALO seal 70 is disclosed by way of example, HALO seals of other configurations would benefit from this disclosure.

The HALO seal 70 is pressed into the carrier 68 and maintained within the carrier 68 with an interference fit. The interference fit is between an inner surface 108 of the carrier 68 and an outer surface 86 of the outer ring 78. An aft wall 88 of the outer ring 78 abuts a forward wall 106 of the carrier 78. A tab 104 of the HALO seal 70 is provided to prevent rotation of the HALO seal 70. The tab 104 extends from a wall 110 of the carrier 68. Replacement of the HALO seal 70 requires removal from the carrier 68. The example HALO seal 70 includes a plurality of tabs 92 that provide a surface for the application of a removal force. Because the beams 82 and shoe 80 are flexible members, they are not sufficiently rigid to withstand axial forces sufficient to remove the HALO seal 70 from the carrier 68. The tabs 92 define surfaces for the application of a removal force.

The carrier 68 includes a plurality of scallops 72 that define openings 74 that enable access to the corresponding plurality of tabs 92. The scallops 72 are spaced evenly about the inner circumference of a forward stop wall 106 of the carrier 68. The HALO seal 70 is pressed into the carrier against the inner surface 108 of the radially extending forward stop wall 106. The HALO seal 70 includes a shoulder 104 that abuts an inner wall 110 of the carrier 68. The seal assembly 66 further includes a first retainer 100 and a second retainer 102 that are supported within the carrier 68. Both the first retainer 100 and the second retainer 102 are press fit into carrier 68.

The openings 74 defined by the scallops 72 are aligned circumferentially with tabs 92 to provide access for a tool to apply an axial force to remove the HALO seal 70 from the carrier 68. Each of the tabs 92 extend radially inward from an inner surface 84 of the outer ring 78. The tabs 92 extend radially inward a distance 94 from the inner surface 84. The distance 94 is less than a range of movement of the radially outermost beam 82 such that the tab 92 does not limit movement of the beam 82 and shoe 80.

The tab 92 includes a width 96 that corresponds with the distance 94 to provide an area for the application of axial force for removing the HALO seal 70. Moreover, each tab 92 provides a part of a total area provided by all of the tabs 92 provided on the HALO seal 70. The total area of all of the combined tabs 92 provides the surface for the application of an axially directed removal force.

Figure 6A:
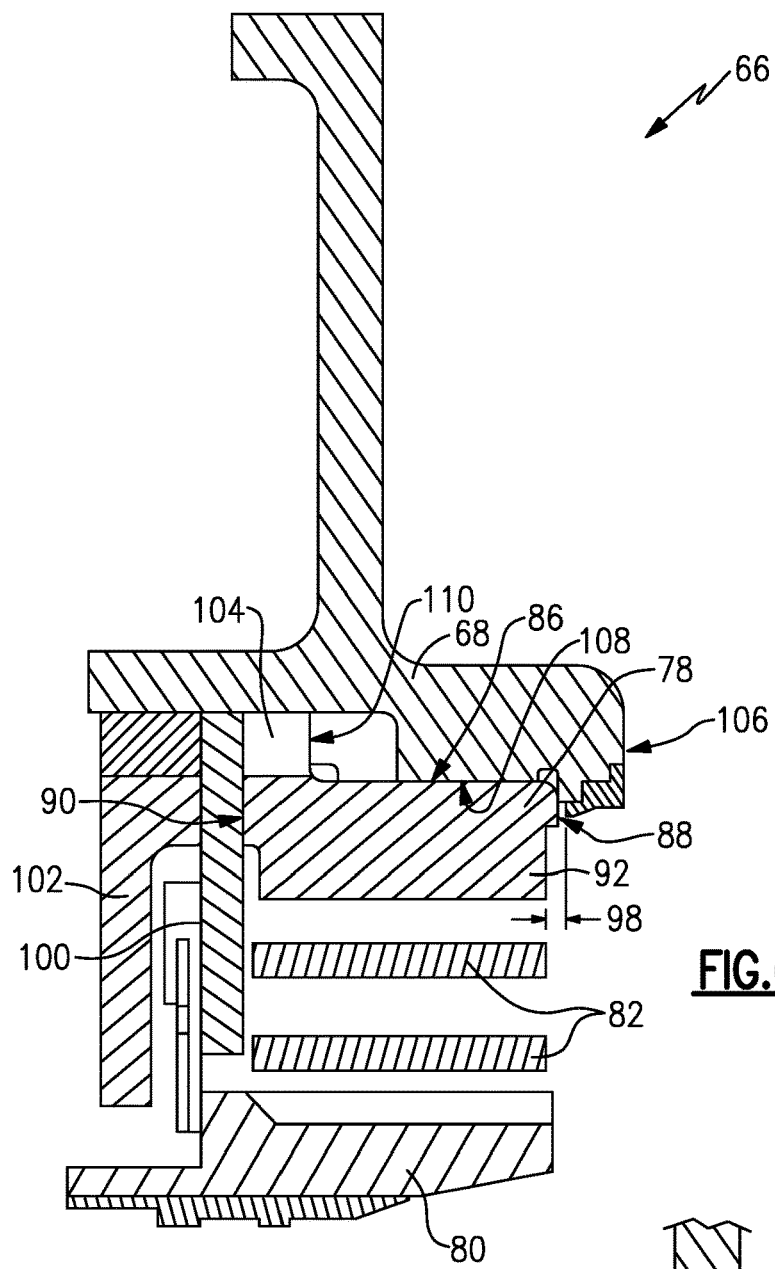
FIG. 6A is a cross-section of the example seal assembly.
Figure 6B:
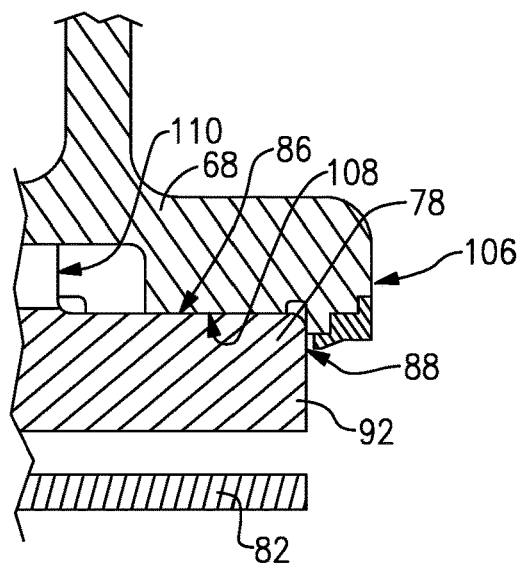
FIG. 6B is a partial cross-section of another example seal assembly.

The example tabs 92 are recessed inward a distance 98 from the front face 88 of the outer ring 78. The recessed distance 98 of the tab 92 from the front face 8 provides additional clearance with the beam 82. Although the example tab 92 is recessed, it is within the scope and contemplation of this disclosure for the tab 92 to be flush with the front face 88 (FIG. 6B). The tab 92 extends from the front face 88 toward an aft face 90 of the HALO seal 70. An aft part of the tab 92 is spaced axially apart from the aft face 90. The first retainer 100 and second retainer 102 are assembled against the aft face 90 within the carrier 68.

Figure 3:
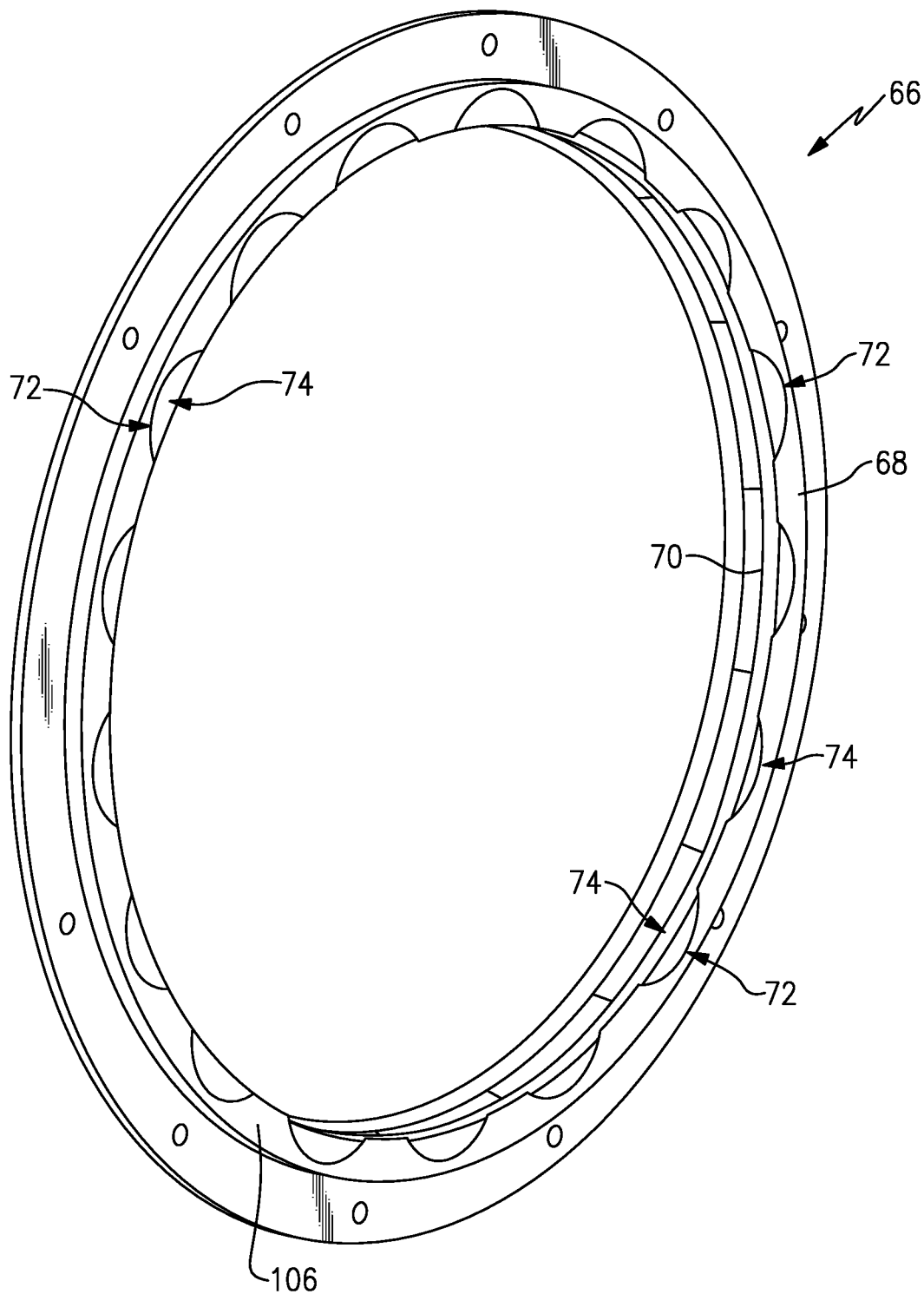
FIG. 3 is a perspective view of an example seal assembly embodiment.
Figure 4:
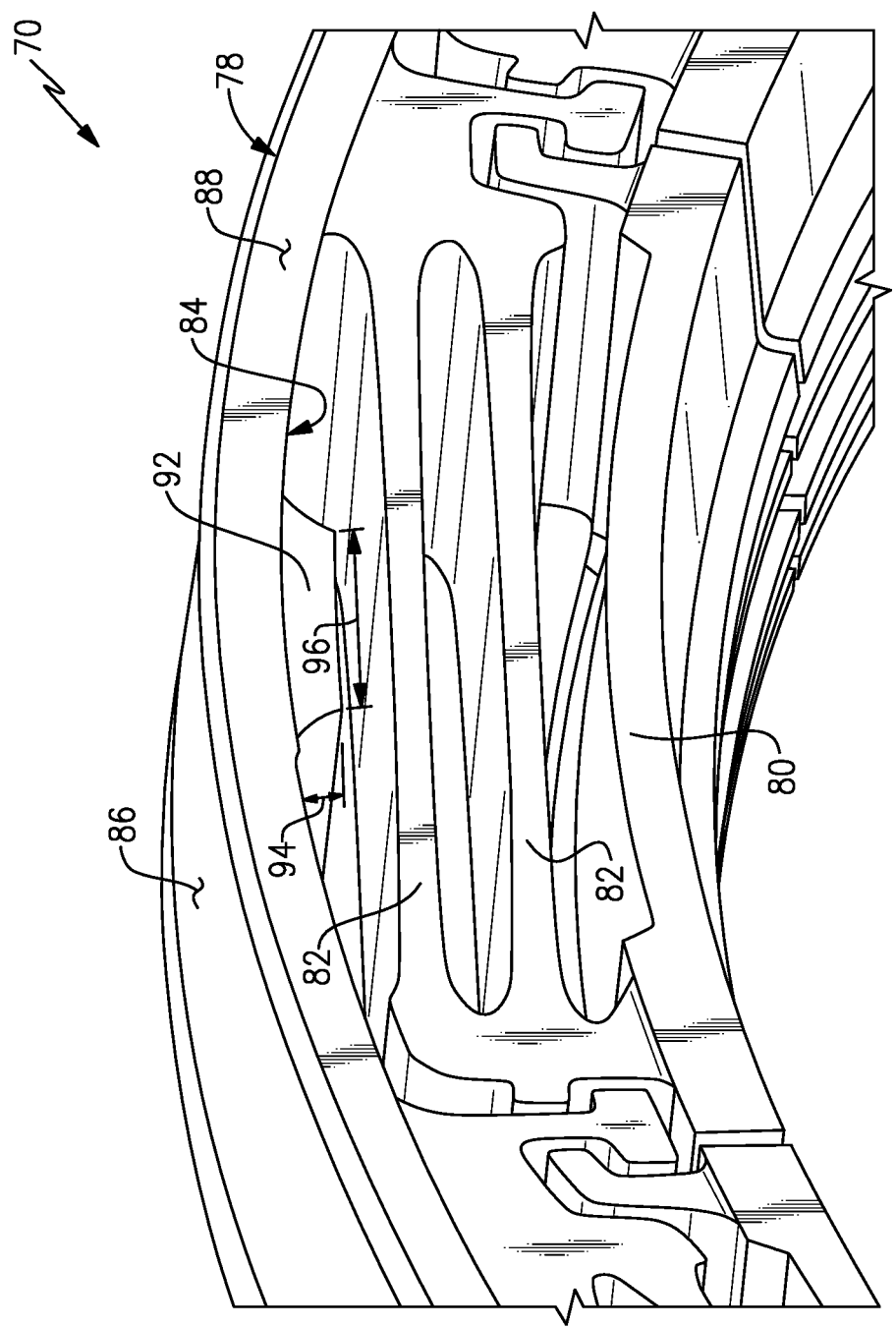
FIG. 4 is a perspective view of a portion of an example seal assembly.
Figure 7:
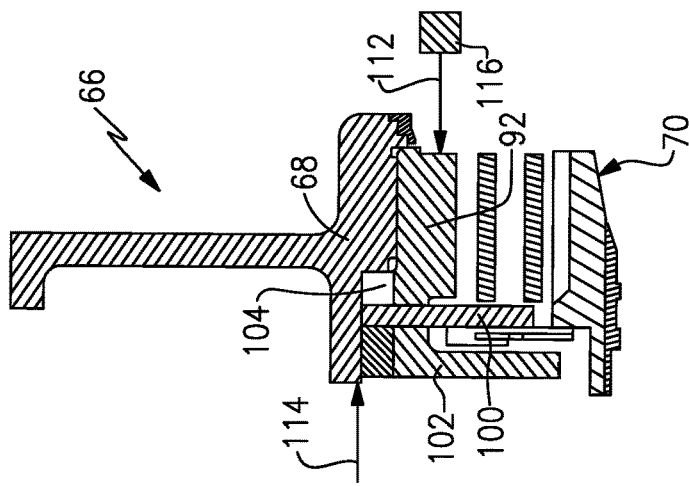
FIG. 7 is a cross-section of the example seal assembly at an initial disassembly step.

Referring to FIG. 7, an initial step of removing the HALO seal 70 from the carrier assembly 66 includes aligning a removal tool schematically indicated at 116 with tabs 92 of the HALO seal 70. The removal tool 116 includes features that engage each of the tabs 92 through the openings 74, as shown in FIGS. 3 and 5, disposed about the circumference of the carrier 68. The removal tool 116 provides for the application of a substantially uniform axial force on all of the plurality of tabs 92. At the same time as the removal force is applied by the removal tool 116, a reaction force indicated by arrow 114 is applied against the carrier 68 in a direction opposite the removal force 112. The reaction force 114 can be applied by a fixture or any tool that provides a sufficient reaction force to counter the removal force 112.

Figure 8:
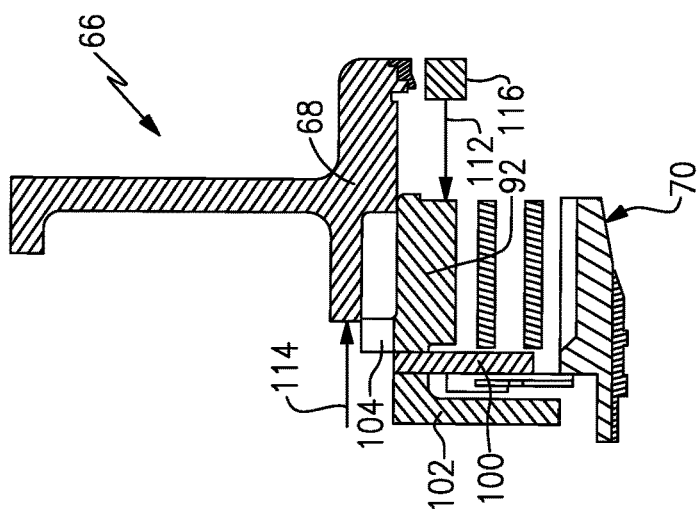
FIG. 8 is a cross-section of the example seal assembly in an intermediate disassembly step.

Referring to FIG. 8, an intermediate part of the removal process is schematically shown with the HALO seal 70 partially pushed out of the carrier 68. The first retainer 100 and the second retainer 102 are removed by movement of the HALO seal 70 in response to the axially applied removal force 112.

Figure 9:
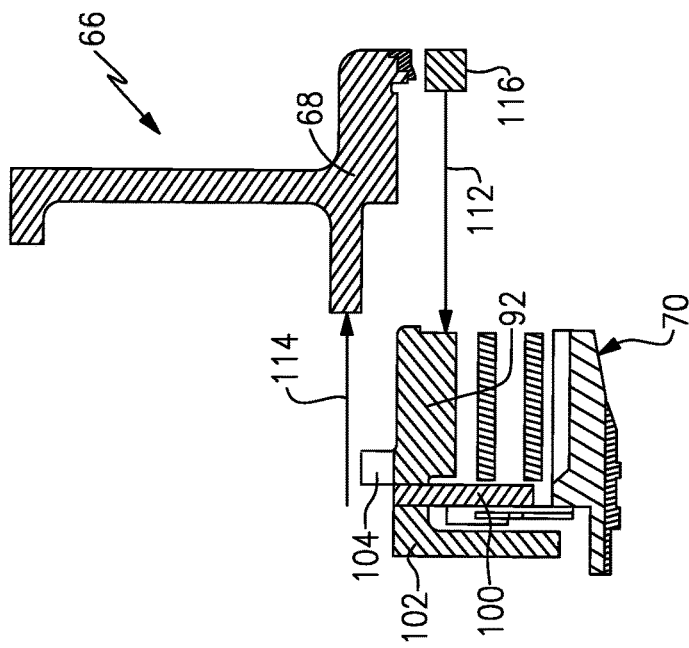
FIG. 9 is a cross-section of the example seal assembly in a final disassembly step.

Referring to FIG. 9, a final part of the removal process is shown with the HALO seal 70 removed from the carrier 68. The HALO seal 70 can then be replaced and reinstalled into the HALO seal 70. The carrier 68 may then be reused with a new HALO seal 70 reinstalled within the turbine section 28.

Accordingly, the example HALO seal 70 includes a plurality of tabs 92 that provide surfaces for the application of removal forces.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A seal assembly for a gas turbine engine comprising:
   a seal carrier;
   a seal press fit within an inner diameter of the seal carrier, the seal including an outer ring supporting a radially moveable shoe supported by at least one beam, the outer ring including an inner radial surface having at least one tab extending radially inward toward the shoe for aiding removal of the seal from the seal carrier, wherein the outer ring includes a first face and the seal carrier includes a stop wall portion extending radially inward, wherein the stop wall portion includes a plurality of circumferentially spaced carrier openings and the at least one tab comprises a plurality of tabs aligned circumferentially with and visible through the plurality of circumferentially spaced openings.

2. The seal assembly as recited in claim 1, including first and second seal retainers received within the seal carrier that abut a second face of the seal carrier.

3. The seal assembly as recited in claim 2, wherein the at least one tab extends axially toward a second face of the outer ring.

4. The seal assembly as recited in claim 2, wherein the at least one tab is spaced axially apart from a second face of the outer ring.

5. The seal assembly as recited in claim 1, wherein the at least one tab is spaced axially apart from the first face of the outer ring.

6. The seal assembly as recited in claim 1, wherein the at least one tab is flush with the first face of the outer ring.

7. A seal assembly for a gas turbine engine comprising:
a seal carrier;
a seal press fit within an inner diameter of the seal carrier, the seal including an outer ring supporting a radially moveable shoe supported by at least one beam, the outer ring including an inner radial surface having at least one tab extending radially inward toward the shoe for aiding removal of the seal from the seal carrier, wherein the outer ring includes a first face and the seal carrier includes a stop wall portion extending radially inward, wherein the stop wall portion includes a plurality of circumferentially spaced carrier openings, wherein the at least one tab extends radially inward a distance less than a minimum distance between a radially outermost one of the at least one beam and the outer ring.

8. A gas turbine engine comprising:
a core engine including a compressor section, a combustor and a turbine section; and
a seal assembly disposed in at least one of the compressor section or the turbine section, wherein the seal assembly includes a seal carrier and a seal press fit within an inner diameter of the seal carrier; the seal including an outer ring supporting a moveable shoe supported by at least one beam, the outer ring including an inner radial surface having at least one tab extending radially inward toward the shoe for aiding removal of the seal from the seal carrier, wherein the at least one tab extends radially inward a distance less than a minimum distance between a radially outermost one of the at least one beam and the outer ring.

9. The gas turbine engine as recited in claim 8, wherein the outer ring includes a first face spaced axially from a second face, the seal carrier includes a stop wall extending radially inward with a plurality of circumferentially spaced slots, the at least one tab is visible through at least one of the plurality of circumferentially spaced slots and at least one seal retainer is supported within the seal carrier that abuts a second face seal.

10. The seal assembly as recited in claim 9, wherein the at least one tab is spaced axially apart from the first face of the outer ring.

\* \* \* \* \*